US008086618B2

(12) United States Patent  (10) Patent No.: US 8,086,618 B2
Lim  (45) Date of Patent: Dec. 27, 2011

(54) CONFIGURATION RULE TRANSLATION MAPPER

(75) Inventor: Kai Peng Lim, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 12/241,217

(22) Filed: Sep. 30, 2008

(65) Prior Publication Data

US 2010/0082523 A1    Apr. 1, 2010

(51) Int. Cl.
  *G06F 17/20*    (2006.01)
(52) U.S. Cl. ........................ 707/760; 707/756
(58) Field of Classification Search .................. 707/602, 707/756, 760, 779
  See application file for complete search history.

(56) References Cited

U.S. PATENT DOCUMENTS

| | | | | |
|---|---|---|---|---|
| 5,537,592 A * | 7/1996 | King et al. | ..................... | 707/756 |
| 5,555,346 A | 9/1996 | Gross et al. | | |
| 6,253,205 B1 | 6/2001 | Quarato et al. | | |
| 7,228,497 B2 | 6/2007 | Lander | | |
| 7,856,415 B2 * | 12/2010 | Gatti | ............................ | 707/602 |
| 2002/0143823 A1 * | 10/2002 | Stevens | ......................... | 707/523 |
| 2004/0083465 A1 | 4/2004 | Zhang et al. | | |
| 2005/0097454 A1 | 5/2005 | Kinno et al. | | |
| 2005/0154983 A1 | 7/2005 | Hailey et al. | | |
| 2006/0106856 A1 | 5/2006 | Bermender et al. | | |
| 2006/0259470 A1 | 11/2006 | Chandrasekharan et al. | | |
| 2007/0016764 A1 * | 1/2007 | Arnfield et al. | ................... | 713/1 |
| 2007/0198564 A1 | 8/2007 | Blackstone et al. | | |
| 2007/0261025 A1 | 11/2007 | Seto et al. | | |
| 2007/0299854 A1 | 12/2007 | Bohlmann et al. | | |
| 2008/0022263 A1 * | 1/2008 | Bak et al. | ....................... | 717/136 |
| 2011/0040824 A1 * | 2/2011 | Harm | ............................. | 709/203 |

FOREIGN PATENT DOCUMENTS

EP    0463251 A1    2/1992

OTHER PUBLICATIONS

Koehn et al., "Statistical Phrase-Based Translation", Proceedings of HLT-NAACL 2003, Main Papers, Edmonton Canada, May-Jun. 2003, pp. 48-54.
Sheard et al., "Template Meta-programming for Haskell", ACM SIGPLAn Notices, vol. 37, No. 12, Dec. 2002, pp. 60-75.

(Continued)

*Primary Examiner* — James Trujillo
*Assistant Examiner* — Soheila Davanlou
(74) *Attorney, Agent, or Firm* — Yee & Associates, P.C.; Steven L. Bennett

(57) ABSTRACT

A system for performing configuration rule translation mapping. One or more feature inputs are received by a configuration rule translation mapper according to requirements for a specific machine type. The one or more feature inputs are translation source data. A selection of one or more translation types is received by the configuration rule translation mapper. Configuration rule translation mapping is performed by the configuration rule translation mapper based on the one or more translation types selected to translate translation source data into a desired format. The translation source data, which is translated into the desired format, is transferred by the configuration rule translation mapper to a configurable transformation macro. Then, a final transformation output is output by the configurable transformation macro using a transformation macro script and one or more transformation templates.

14 Claims, 9 Drawing Sheets

OTHER PUBLICATIONS

Mariatos et al., "A Mapping Algorithm for Computer Assisted Exploration in the Design of Embedded Systems", ACM Transactions on Design Automation of Electronic Systems, vol. 6, No. 1, Jan. 2001, pp. 122-147.

Roll, "Towards Model-Based and CCM-Based Applications for Real-Time Systems", Proceedings of the Sixth IEEE International Symposium on Object Oriented Real Time Distributed Computing, 2003, pp. 1-8.

U.S. Appl. No. 12/241,226, filed Sep. 30, 2008, Lim.

U.S. Appl. No. 12/241,241, filed Sep. 30, 2008, Lim.

* cited by examiner

INPUT SOURCE DATA
700

"DYNAMIC_MinMaxInc_transformation.dat"
KBSNAME, FEATURENO, COMMENTS
MT 1000_TMF_Group,1234, limk A@20071203

TRANSFORMATION
TEMPLATE
800

"DYNAMIC_MinMaxInc_template1.tdt"
802 — <@KEY=TemplateKey1>
804 — <@F:READVAR(VAR_DYN_MINMAX_1)>
806 — <@F:WRITEFILE(DYNAMIC_MinMaxInc_&KBSNAME.csv)>
      <@HDR>KBSName,RequiredParts#4,Quantity,NLSID,SubstitutionData,Comments
808 — <@F:FCOUT:1234>&KBSNAME,&HDR:RequiredParts(5961),CABLE_OC:LF_P_AMOD_Min$=1,&NLSID,&SubstitutionData,&COMMENTS
810 —

FIG. 8

TRANSFORMATION
MACRO SCRIPT
900

"transformscript1.tsm"
902 — <@DRIVE=@SETUP-INFO(TemplateDrive)>
904 — <@F:READTEMPLATE(DRIVE,DYNAMIC_MinMaxInc_template1.tdt>   //Read TemplateDrive from setup file
                                                                 //Read template1.tdt from DRIVE
906 — <@LOOP(1)><@TDT_USE-KEY(KEY, TemplateKey1)>               //Loop 1 times of the transformed data.
908 — <@PROCEED>                                                 //Proceed with the script.

FIG. 9

TRANSFORMATION
OUTPUT
1000

"DYNAMIC_MinMaxInc_MT1000_TMF_Group.csv"
KBSName,RequiredParts,RequiredParts2,RequiredParts3,RequiredParts4,Quantity,NLSID,SubstitutionData,Comments
MT1000_TMF_Group,5961,,,,CABLE_OC:LF_P_AMOD_Min$=1,,,limk A@20071203

FIG. 10

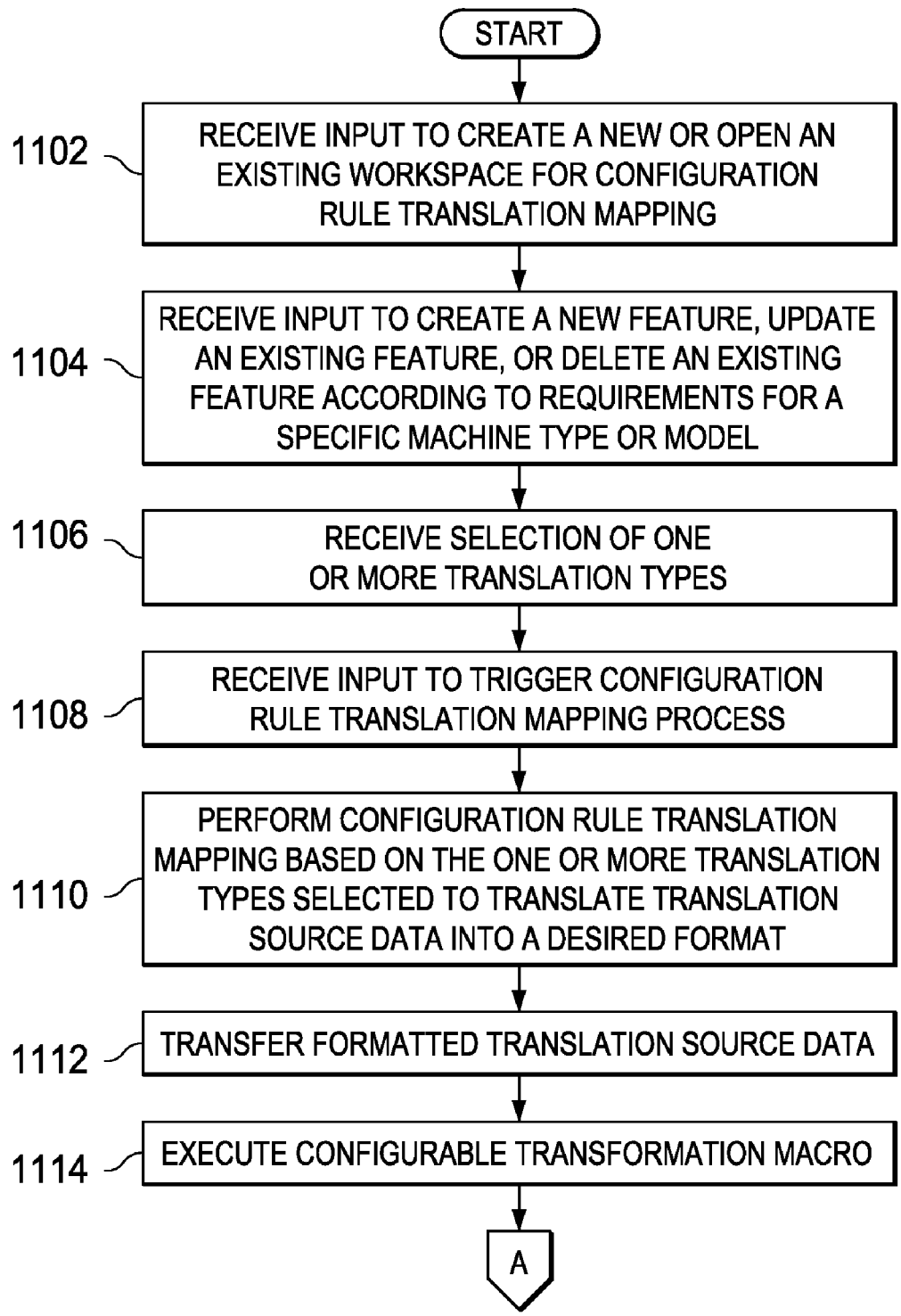

CONFIGURATION RULE TRANSLATION MAPPER

BACKGROUND OF THE INVENTION

1. Field of the Invention

The present invention relates generally to an improved data processing system and more specifically to a computer implemented method, system, and computer usable program code for automatically performing configuration rule translation mapping based on one or more translation types selected to format translation source data into one or more desired formats.

2. Description of the Related Art

Today, before configuration rules can be generated into constraints for use within Selectica® KnowledgeBase Development Environment™ (.kbs) files running inside a configuration rule engine for the KnowledgeBase Development Environment™, developers need to manually create these configuration rules word by word and column by column for each comma-separated values (CSV) file created for each different machine type. In addition, developers need to manually create a separate CSV file, which contains the configuration rules, for each different release or version of a machine type that has a different configuration. Also, developers need to ensure that the syntax of these configuration rules is correct and that no missing commas exist to separate each column. The KnowledgeBase Development Environment™ configuration rule engine uses the .kbs files to interact with web applications for configuration/transformation purposes.

Further, developers must manually update the configuration rules in a CSV file whenever a different release or version of a machine type is developed. As a result, whenever there is a need to develop configuration rules for different releases of a machine type with different expression syntax, developers need to manually change the configuration rules to coincide with the new release. Furthermore, a Perl script or macro utility must be run to ensure that the configuration rules in the CSV file for the new release are in a proper format. Thus, developers currently need to setup, understand, and use multiple types of configuration tools to ensure that the modeled configuration rules are in a correct syntax.

BRIEF SUMMARY OF THE INVENTION

According to one embodiment of the present invention, configuration rule translation mapping is performed. One or more feature inputs are received by a configuration rule translation mapper according to requirements for a specific machine type. The one or more feature inputs are translation source data. A selection of one or more translation types is received by the configuration rule translation mapper. Configuration rule translation mapping is performed by the configuration rule translation mapper based on the one or more translation types selected to translate translation source data into a desired format. The translation source data, which is translated into the desired format, is transferred by the configuration rule translation mapper to a configurable transformation macro. Then, a final transformation output is output by the configurable transformation macro using a transformation macro script and one or more transformation templates.

BRIEF DESCRIPTION OF THE SEVERAL VIEWS OF THE DRAWINGS

FIG. 8 is an exemplary illustration of a transformation template in accordance with an illustrative embodiment;

FIG. 9 is an exemplary illustration of a transformation macro script in accordance with an illustrative embodiment;

FIG. 10 is an exemplary illustration of a transformation output in accordance with an illustrative embodiment;

FIG. 11A and FIG. 11B is a flowchart illustrating an exemplary process for performing configuration rule translation mapping in accordance with an illustrative embodiment.

DETAILED DESCRIPTION OF THE INVENTION

Figure 1:
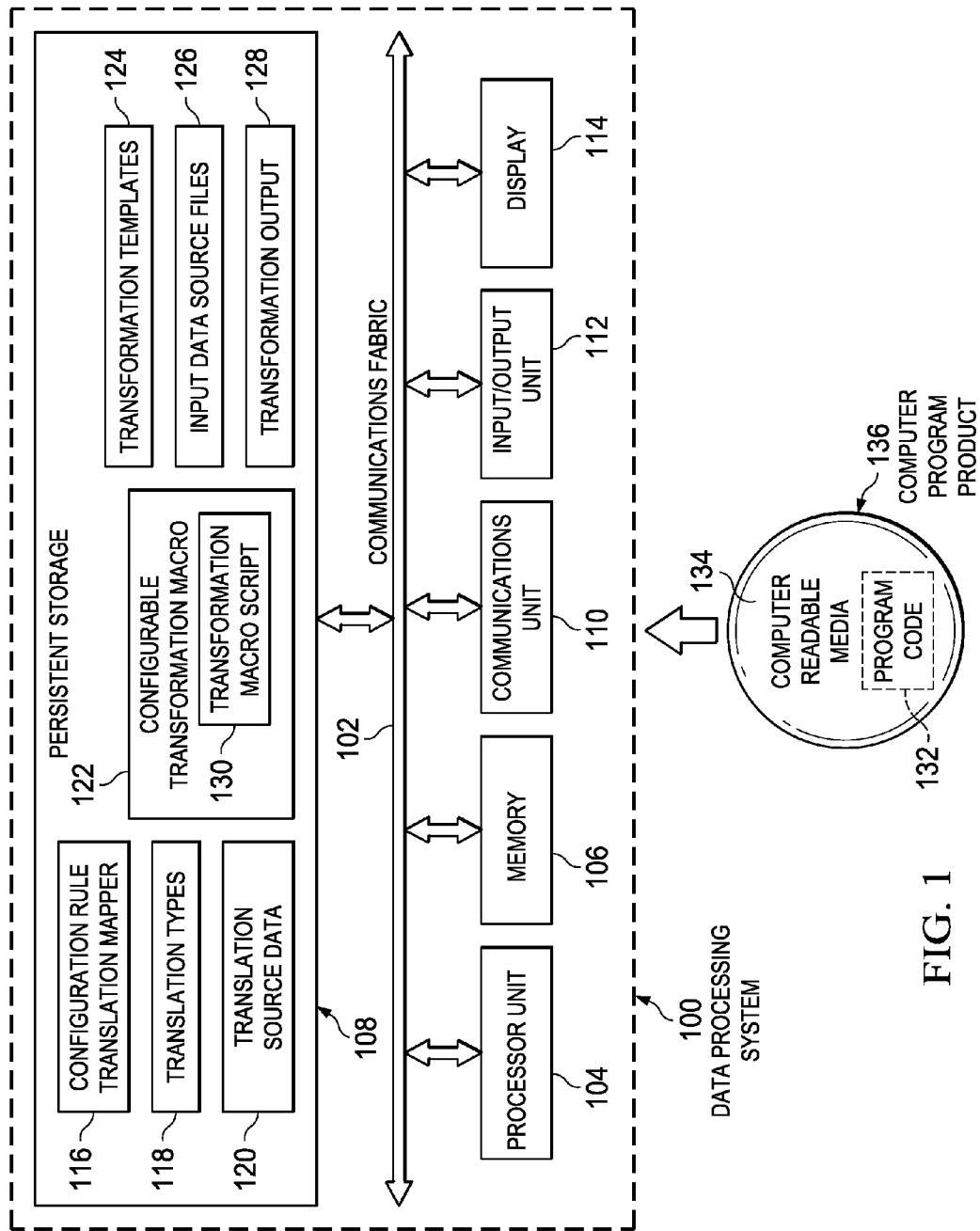
FIG. 1 is a diagram of a data processing system in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to data processing environments in which different illustrative embodiments may be implemented. Many modifications to the depicted environment may be made.

FIG. 1 depicts a diagram of a data processing system in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a transient basis and/or a persistent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Configuration rule translation mapper 116, translation types 118, translation source data 120, configurable transformation macro 122, transformation templates 124, input data source files 126, and transformation output 128 reside on persistent storage 108. Configuration rule translation mapper 116 is a processing tool that includes a translation engine, which allows a user to select one or more translation types, an action, or a scheduled job that will trigger the execution of a translation processor to read one or more transformation templates for translating or transforming data into a desired format within the configuration rule translation mapping process. Graphical user interfaces, such as the ones shown in the illustrative examples of FIGS. 5 and 6, may be implemented on top of the translation engine, thus making translation type selection to be performed by not just the user. In addition, it is possible to integrate the processing tool with a scheduler to run scheduled jobs to trigger the configuration rule translation mapping process. Translation types 118 are pointers or reference keys, which are tied to one or more translation processors that are used by configuration rule translation mapper 116 to create the desired transformation output data or action. Translation source data 120 are input data, such as, for example, a parameter value or a word from a language, that configuration rule translation mapper 116 uses to create the desired transformation output.

Configurable transformation macro 122 is a macro for transforming source input data, which is stored in a particular file format, into another file format. The word "configurable" means that configurable transformation macro 122 may be configured to be used in a plurality of different application types. A macro is a rule or pattern that specifies how a particular data input sequence should be mapped to an output sequence according to a defined process or procedure. A file format is a specific way to encode data for storage in a computer file.

Configurable transformation macro 122 includes transformation macro script 130. Transformation macro script 130 is a scripting language, such as, for example, JavaScript®, for controlling the process of transforming source input data from one file format to another. Transformation macro script 130 is modular in nature. Modular means that transformation macro script 130 is a self-contained component and may be combined or grouped with other transformation macro scripts.

Transformation macro script 130 utilizes transformation templates 124 in the data transformation process. Transformation templates 124 represent one or more transformation templates that contain, for example, source input data, default values, and logic used in the data transformation process by transformation macro script 130.

Input data source files 126 represent one or more files that contain input source data, which transformation macro script 130 reads and translates into the desired transformation output. Even though this exemplary illustration shows input data source files 126 residing on persistent storage 108, input data source files 126 may alternatively reside on a remote database. Transformation output 128 represents the desired final output of the logical processing of input data source files 126 by configurable transformation macro 122 using transformation macro script 130 and transformation templates 124.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 132 is located in a functional form on computer readable media 134 that is selectively removable and may be loaded onto or transferred to data processing system 100 for execution by processor unit 104. Program code 132 and computer readable media 134 form computer program product 136 in these examples. In one example, computer readable media 134 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 134 also may take the form of a persistent storage, such as a hard drive, a thumb drive, or a flash memory that is connected to data processing system 100. The tangible form of computer readable media 134 is also referred to as computer recordable storage media. In some instances, computer readable media 134 may not be removable.

Alternatively, program code 132 may be transferred to data processing system 100 from computer readable media 134 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 132 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 132 may be a server computer, a client computer, or some other device capable of storing and transmitting program code 132.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, the data processing system may include organic components integrated with organic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 134 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Historically, developers are required to manually code and modify configuration rules in CSV file format. In addition, developers are currently required to run Perl script or a macro utility to ensure that the configuration rule format is correct. However, illustrative embodiments break this dependency between CSV file format rule creation and manual efforts by the developers.

Illustrative embodiments provide a computer implemented method, system, and computer usable program code for performing configuration rule translation mapping. Illustrative embodiments significantly reduce or remove the need to manually change configuration rules or update the configuration rules in CSV files and/or .kbs files that contain configuration constraints. In addition, illustrative embodiments remove the need to manually add or modify list (.lst) files. List files are used as containers to store lists of names, such as, for example, "SomeName.kbs" or "SomeName.csv". Without these .lst files, current build processes do not know what files are being used for processing. Further, whenever new syntax is introduced to replace existing syntax for a CSV file format, illustrative embodiments read all the files or data and make the necessary changes.

As a result, illustrative embodiments do not require developers to model rules for each machine type or .kbs file group. A machine type or model (MTM) is a specific version or release of a data processing system. Developers just need to populate the configuration rule translation mapper tool with the appropriate data and generate a selected file or a set of appropriate files for the configuration build process. Thus, developers do not need to worry about the syntax, columns, or commas required by the CSV file format.

The configuration rule translation mapper may be created by a configurable transformation macro that is used for other types of data mapping processes. Consequently, illustrative embodiments may be used to resolve other types of data translation issues, such as, for example, transverse translation within a multi-language dictionary system. Moreover, illustrative embodiments do not limit translation to only a data to data translation context, but also to a data to action or process translation context.

Illustrative embodiments provide a simple configuration rule translation mapper tool that allows a user to select one or more translation types and to trigger execution of the tool to read transformation templates for translation purposes. During the translation process, illustrative embodiments define and allocate the type of translation processes for the selected translation type(s). The configuration rules files and other required files or data are read, translated, and mapped accordingly. In addition, illustrative embodiments allow a user to modify input data exceptions that cannot be translated or mapped. Exceptions that cannot be translated or mapped are tagged with an indication code. Also, the configuration rule translation mapper tool validates the corrected exceptions before saving to a target folder or inserting into a database. Finally, illustrative embodiments write the properly formatted output to the target folder.

A translation type indicates the type of translation processes that take place for the creation of the desired transformation output, action, or process. The configuration rule translation mapper is a processing tool that transforms relations analytically by navigating the source translation data for linkage associations through managed aspects and proportional perspectives for the data involved. The configuration rule translation mapper is used to change or translate the form, the condition, and the nature of data into a desired format according to mapping information contained in the configuration translation mapper tool. A simple or rich client based application may be created for the interactive configuration rule translation mapping.

In addition to solving translation or configuration type problems, functionalities of illustrative embodiments may be used to reduce the need to customize coding for data translation; be a part of a corpus-based technology, such as a multi-language dictionary system, which performs language translation (e.g., from Chinese to English); to translate and map the structure of a product into data and images for a system; to translate and map the anatomy of a living thing into data and images for a system; to translate and map real world processes into a workflow of a system; and to translate and map real world objects into a virtual world of a simulation system.

Some advantages of illustrative embodiments are: developers just need to write a simple template for a single translation or multiple translations; key developers just need to ensure that the translation templates are in top condition; developers are not required to do manually intensive work for subsequent configuration rule changes (i.e., no need exists to run Perl script for format validation); code reviewers are not required to check the syntax of the code, which means lower development costs because of lower resource needs; easy version control for different releases of a machine type or model, which removes the need for double work when development of two different releases with different syntax run in parallel; high reusability because the configuration rule translation mapper tool is designed to use existing configuration rules and to translate the existing configuration rules for use by other machine types or models.

Figure 2:
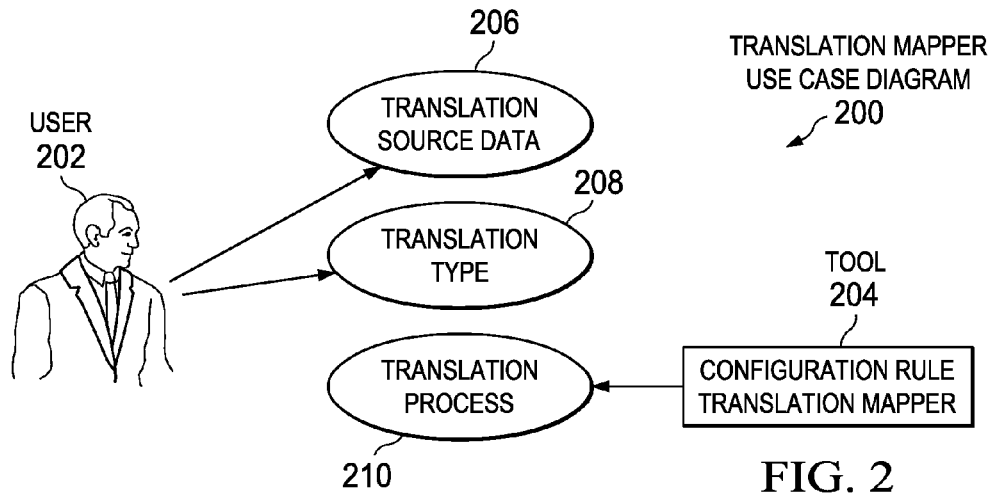
FIG. 2 is an exemplary illustration of a translation mapper use case diagram in accordance with an illustrative embodiment.

With reference now to FIG. 2, an exemplary illustration of a translation mapper use case diagram is depicted in accordance with an illustrative embodiment. Translation mapper use case diagram 200 is a use case diagram for configuration rule translation mapping. Translation mapper use case diagram 200 includes user 202 and configuration rule translation mapper 204. Configuration rule translation mapper 204 may, for example, be configuration rule translation mapper 116 in FIG. 1.

In this exemplary illustration, user 202 selects translation source data 206. Translation source data 206 may, for example, be translation source data 120 in FIG. 1. Translation source data 206 is the source of data to be translated by configuration rule translation mapper 204.

Also in this exemplary illustration, user 202 selects translation type 208. Translation type 208 may, for example, represent one or more translation types within translation types 118 in FIG. 1. Translation type 208 is the type of translation the user desires to occur while translating translation source data 206 into the desired transformation output, such as transformation output 128 in FIG. 1.

Further in this exemplary illustration, configuration rule translation mapper 204 automatically executes translation process 210 after the user selects translation source data 206 and translation type 208. Alternatively, user 202 may manually execute configuration translation mapper 204 to perform translation process 210. Translation process 210 is the process whereby configuration rule translation mapper 204 translates translation source data 206 into the desired transformation output by utilizing translation type 208 as the basis for the data translation.

Figure 3:
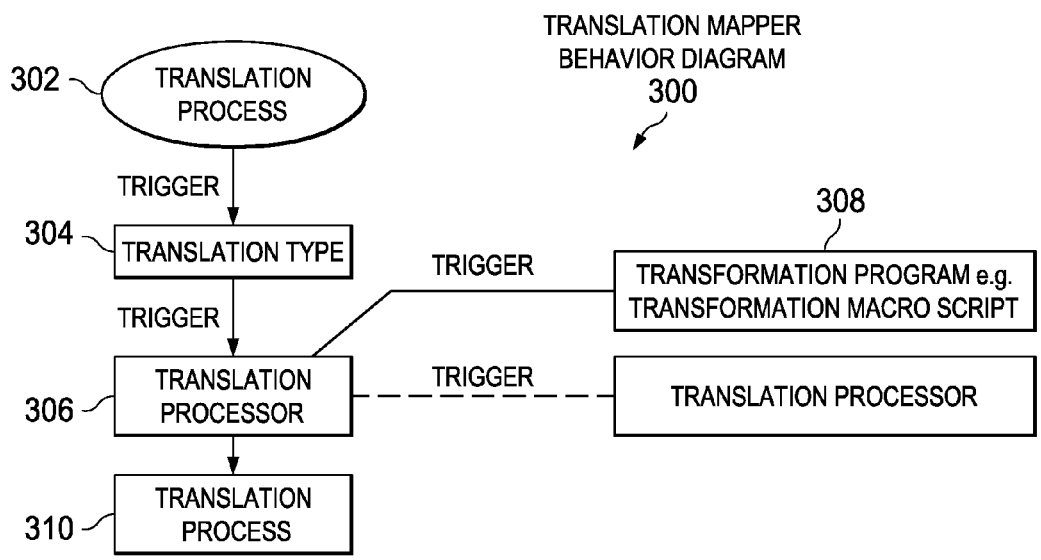
FIG. 3 is an exemplary illustration of a translation mapper behavior diagram in accordance with an illustrative embodiment.

With reference now to FIG. 3, an exemplary illustration of a translation mapper behavior diagram is depicted in accordance with an illustrative embodiment. Translation mapper behavior diagram 300 is a behavior diagram for configuration rule translation mapping. Translation mapper behavior diagram 300 includes translation process 302, translation type 304, and translation processor 306.

Translation process 302 may, for example, be translation process 210 in FIG. 2. Translation process 302 may be automatically triggered by a system, such as data processing system 100 in FIG. 1, or may be manually triggered by a user, such as user 202 in FIG. 2. Translation process 302 triggers the user to select translation type 304. Translation type 304 may, for example, be translation type 208 in FIG. 2.

Selection of translation type 304 triggers translation processor 306. Translation processor 306 represents one or more translation processors. Translation processor 306 may, for example, be located within a configuration rule translation mapper, such as configuration rule translation mapper 204 in FIG. 2. Translation processor 306 translates translation source data, such as translation source 206 in FIG. 2, into a desired transformation output, such as transformation output 128 in FIG. 1. Translation processor 306 triggers transformation program 308. Transformation program 308 may, for example, be a transformation macro script, such as transformation macro script 130 in FIG. 1. Triggering translation processor 306 allows translation process 310 to proceed to completion.

Figure 4:
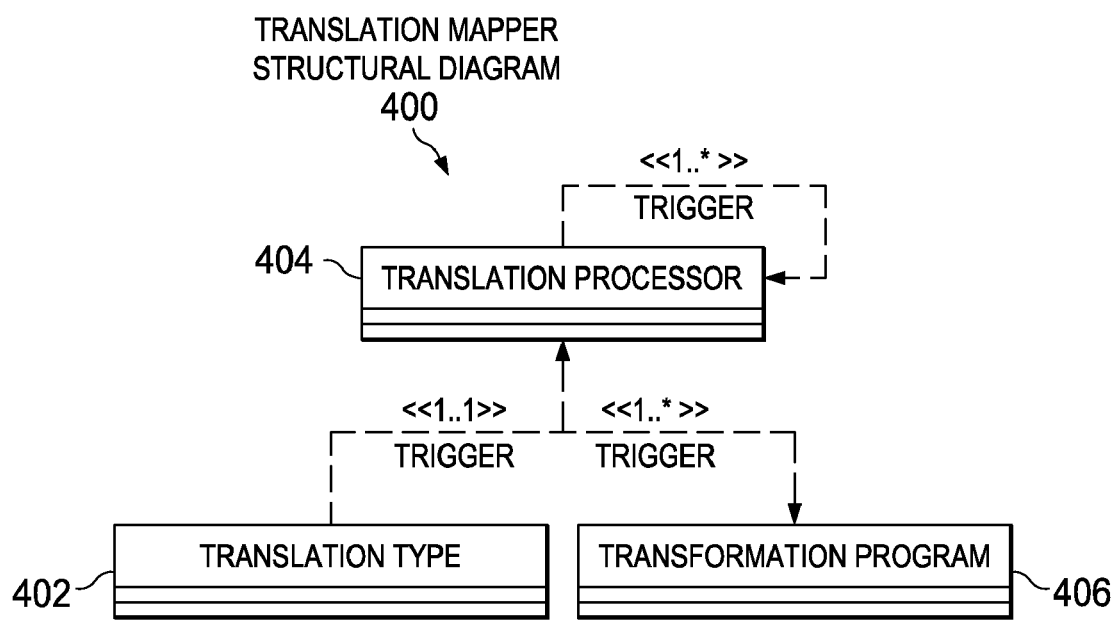
FIG. 4 is an exemplary illustration of a translation mapper structural diagram in accordance with an illustrative embodiment.

With reference now to FIG. 4, an exemplary illustration of a translation mapper structural diagram is depicted in accordance with an illustrative embodiment. Translation mapper structural diagram 400 is a structural diagram for configuration rule translation mapping. Translation mapper structural diagram 400 includes translation type 402, translation processor 404, and transformation program 406.

Translation type 402 may, for example, be translation type 304 in FIG. 3. Translation type 402 triggers translation processor 404. Translation processor 404 may, for example, be translation processor 306 in FIG. 3. Translation processor 404 may trigger one or more other translation processors to assist in the translation process and will continue the translation process until completion. In addition, translation type 402 triggers transformation program 406. Transformation program 406 may, for example, be transformation program 308 in FIG. 3. Transformation program 406 may trigger one or more other transformation programs to assist in the translation process.

Figure 5:
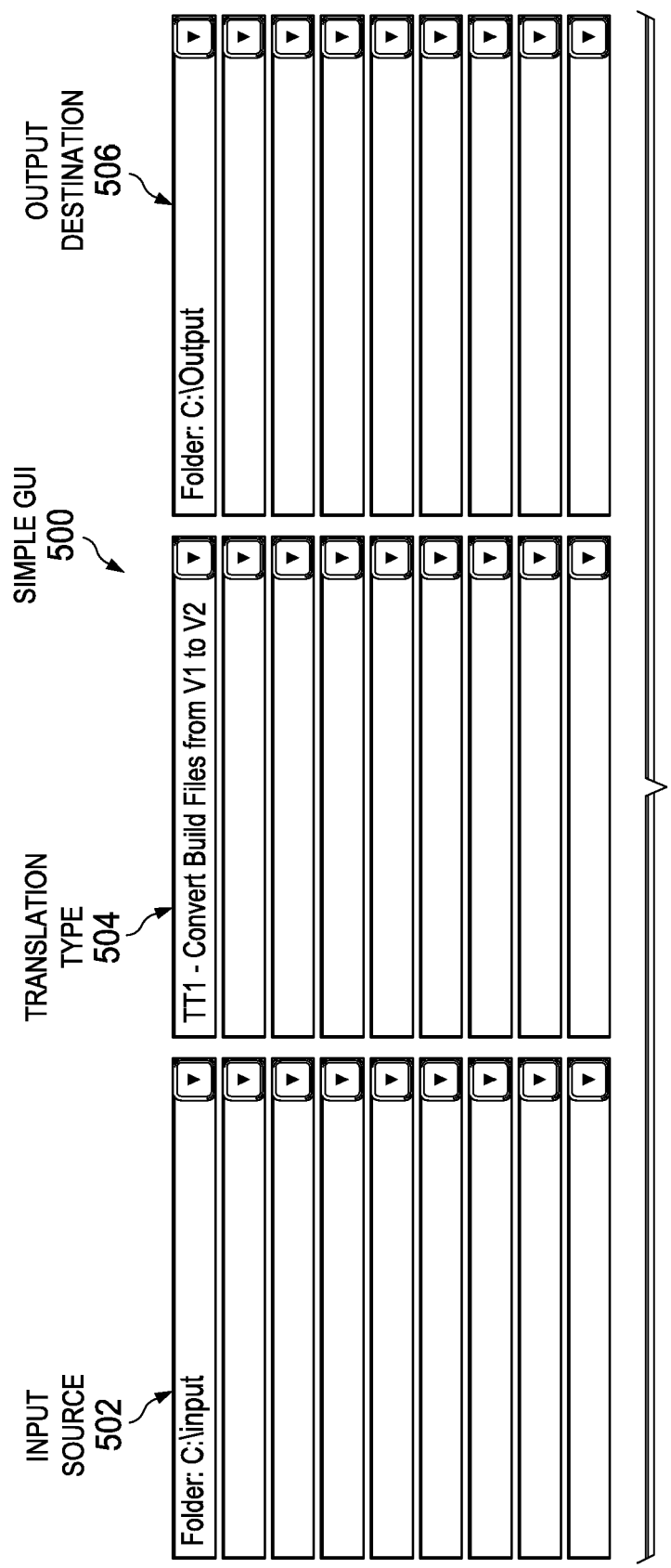
FIG. 5 is an exemplary illustration of a simple graphical user interface in accordance with an illustrative embodiment.

With reference now to FIG. 5, an exemplary illustration of a simple graphical user interface is depicted in accordance with an illustrative embodiment. Simple graphical user interface (GUI) 500 is an interface that a user, such as user 202 in FIG. 2, may utilize to interact with a configuration rule translation mapper, such as configuration rule translation mapper 116 in FIG. 1. Simple GUI 500 includes input source 502, translation type 504, and output destination 506. However, it should be noted that simple GUI 500 is only meant as an example and not intended as a limitation on illustrative embodiments. In other words, simple GUI 500 may include any features necessary for processes of the illustrative embodiments to function.

In this exemplary illustration, input source 502 is an input data source located within a folder in a "C:" drive of the system, such as, for example, translation source data 120 located within persistent storage 108 in data processing system 100 in FIG. 1. However, it should be noted that input source 502 may represent a plurality of data sources and may be located in a plurality of locations either locally and/or remotely. Translation type 504 may, for example, be translation type 402 in FIG. 4. In this exemplary illustration, translation type 504 instructs the configuration rule translation mapper, such as configuration rule translation mapper 116 in FIG. 1, to convert build files from version one (V1) of a machine type to version two (V2) of that machine type. In other words, translation type 504 is the type of translation to be performed during the translation process. For example, the configuration rule translation mapper translates version one of a machine type into version two of that same machine type.

Output destination 506 is a destination for output data from the configuration rule translation mapper. In this exemplary illustration, output destination 506 is another folder in the "C:" drive of the system. However, it should be noted that output destination 506 may represent a plurality of output destinations either locally and/or remotely.

Figures 6, 7:
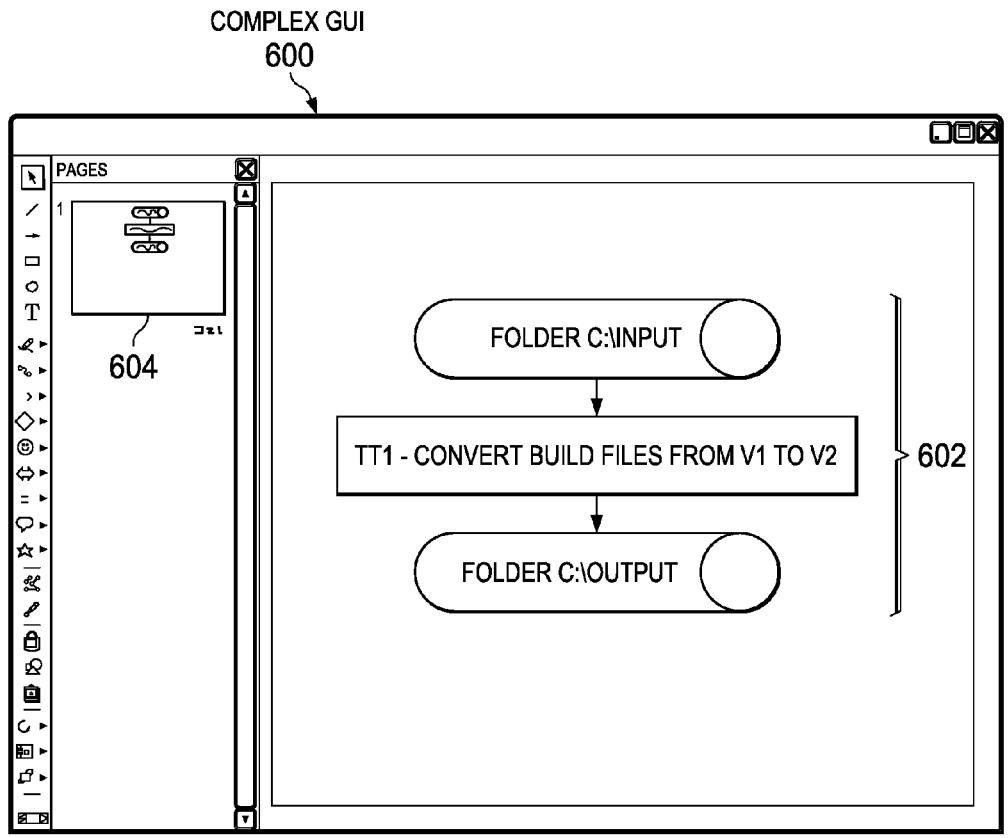
FIG. 6 is an exemplary illustration of a complex graphical user interface in accordance with an illustrative embodiment.
FIG. 7 is an exemplary illustration of a data source file in accordance with an illustrative embodiment.

With reference now to FIG. 6, an exemplary illustration of a complex GUI is depicted in accordance with an illustrative embodiment. Complex GUI 600 represents a more complex interface that a user, such as user 202 in FIG. 2, may utilize to interact with processes of illustrative embodiments. Complex GUI 600 includes graphical elements 602 and thumbnail 604. However, it should be noted that complex GUI 600 is only meant as an example and not intended as a limitation on illustrative embodiments. In other words, complex GUI 600 may include any features necessary for the processes of the illustrative embodiments to function.

Graphical elements 602 graphically depict the elements that the user may select in the translation process. In this exemplary illustration, graphical elements 602 include "Folder:C:\input", "TT1—Convert Build Files from V1 to V2", and "Folder:C:\Output", such as the elements included in input source 502, translation type 504, and output destination 506 in FIG. 5. In other words, complex GUI 600 may be a more complex depiction of simple GUI 500 in FIG. 5. Thumbnail 604 is a thumbnail image of graphical elements 602. Thumbnail 604 may be one of a plurality of thumbnail images shown in complex GUI 600 for selection by a user.

With reference now to FIG. 7, an exemplary illustration of a data source file is depicted in accordance with an illustrative embodiment. Input source data 700, which is named "DYNAMIC_MinMaxInc_transformation.dat" in this exemplary illustration, may, for example, represent one or more files within input data source files 126 in FIG. 1. Also, input source data 700 may represent data from a plurality of data sources.

Input source data 700 is submitted to a configurable transformation macro, such as configurable transformation macro 122 in FIG. 2, for transformation from one data format to another data format to produce the desired transformation output, such as transformation output 128 in FIG. 1. In addition, input source data 700 may be located within one or more transformation templates, such as transformation templates 124 in FIG. 1. In this illustrative example, input source data 700 includes information regarding machine type "MT 1000".

With reference now to FIG. 8, an exemplary illustration of a transformation template is depicted in accordance with an illustrative embodiment. Transformation template 800, which is named "DYNAMIC_MinMaxInc_template1.tdt" in this illustrative illustration, may, for example, represent one or more templates within transformation templates 124 in FIG. 1. In addition, transformation template 800 may contain all the input source data, default values, and logic necessary for a configurable transformation macro, such as configurable transformation macro 122 in FIG. 1, to perform data transformation processes. Further, the configurable transformation macro may generate transformation template 800.

Also, it should be noted that div tags that contain "@F", such as "@F:READVAR", "@F:WRITEFILE", and "@F: FCOUT" are extended functions for the configurable transformation macro. An extended function is a function that developers create to add a function to the configurable transformation macro, which is used by a transformation macro script, such as transformation macro script 130 in FIG. 1. Also, div tags that do not contain "@F", such as "@KEY" and "@HDR", are internal functions for the configurable transformation macro. An internal function is a function that exists within the configuration transformation macro.

In addition, div tag 802 "@KEY" identifies the reference key associated with transformation template 800 and the filename "TemplateKey1". Div tag 804 "<@F:READVAR (VAR_DYN_MINMAX_1)>" instructs the configurable transformation macro to read the variable "VAR_DYN_ MINMAX_1". Div tag 806 "<@F:WRITEFILE (DYNAMIC_MinMaxInc_&KBSNAME.csv)>" instructs the configurable transformation macro to write data to the CSV file "DYNAMIC_MinMaxInc_&KBSNAME". Div tag 808 "@HDR>KBSName" instructs the configurable transformation macro to transform the CSV file using "SubstitutionData". Div tag 810 "@F:FCOUT" instructs the configurable transformation macro to output the desired transformation output.

With reference now to FIG. 9, an exemplary illustration of a transformation macro script is depicted in accordance with an illustrative embodiment. Transformation macro script 900, which is named "transformscript1.tms" in this exemplary illustration, may, for example, be transformation macro script 130 in FIG. 1. In addition, transformation macro script 900 may, for example, be JavaScript®. A translation processor, such as translation processor 404 in FIG. 4, may generate transformation macro script 900.

Div tag 902 "@DRIVE" instructs transformation macro script 900 to read a setup file to prepare the environment for the configurable transformation macro, such as configurable transformation macro 122 in FIG. 1. Div tag 904 "@F:READTEMPLATE" instructs transformation macro script 900 to read a transformation template, such as transformation template 800 in FIG. 8 that is named "DYNAMIC_MinMaxInc_template1.tdt". Div tag 906 "@LOOP(1)" instructs transformation macro script 900 to loop through the transformation template, which has a reference key of "TemplateKey1", such as div tag 802 "<@KEY=TemplateKey1>" in FIG. 8, one time. Div tag 908 "@PROCEED" instructs transformation macro script 900 to proceed with the logical processing of the input source data, such as input source data 700 in FIG. 7, until completion.

With reference now to FIG. 10, an exemplary illustration of a transformation output is depicted in accordance with an illustrative embodiment. Transformation output 1000 may, for example, be transformation output 128 in FIG. 1. A configurable transformation macro, such as configurable transformation macro 122 in FIG. 1, produces transformation output 1000 by executing a transformation macro script, such as transformation macro script 900 in FIG. 9, to logically process input source data, such as input source data 700 in FIG. 7, for machine type "MT 1000" using one or more transformation templates, such as transformation template 800 in FIG. 8.

Figure 11B:
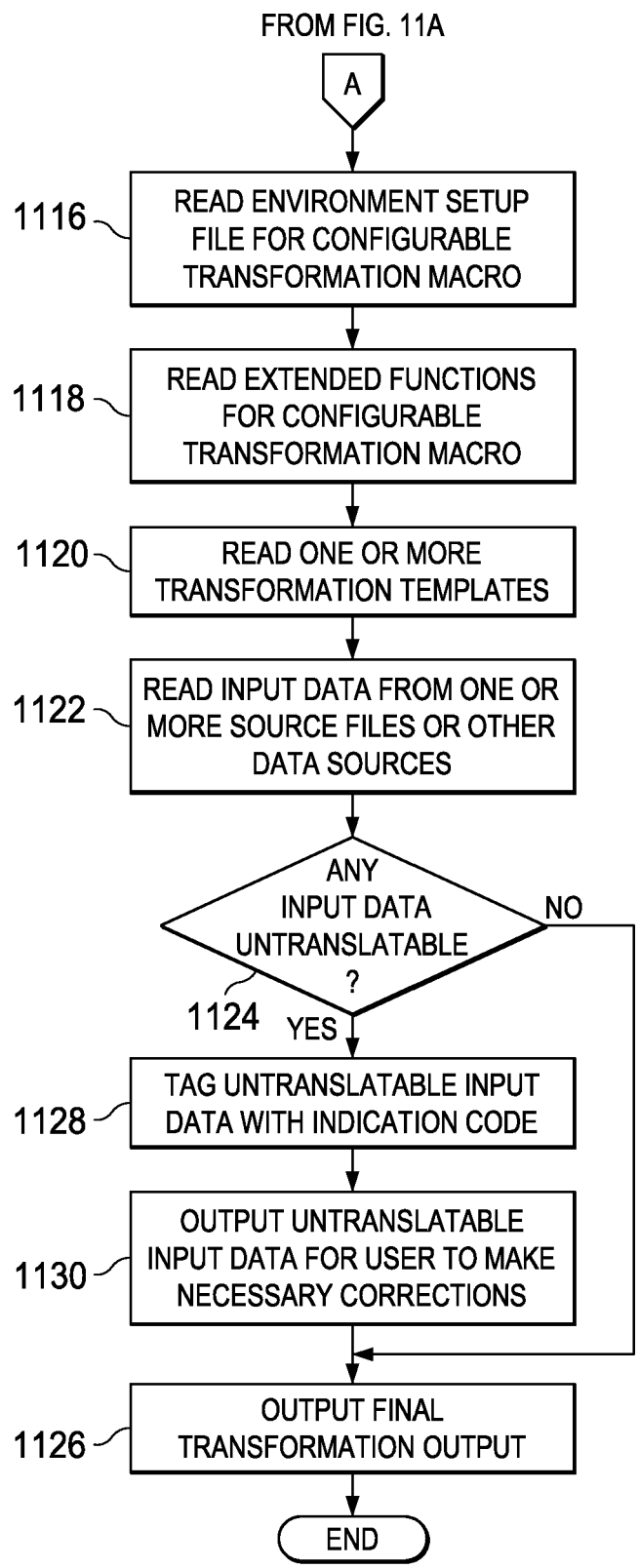

With reference now to FIG. 11A and FIG. 11B, a flowchart illustrating an exemplary process for performing configuration rule translation mapping is shown in accordance with an illustrative embodiment. The process shown in FIGS. 11A and 11B may be implemented in a data processing system, such as data processing system 100 in FIG. 1.

The process begins when the data processing system utilizes a configuration rule translation mapper, such as configuration rule translation mapper 116 in FIG. 1, to receive an input to create a new, or to open an existing, workspace for configuration rule translation mapping (step 1102). After creating or opening the workspace in step 1102, the configuration rule translation mapper receives an input to create a new feature, update an existing feature, or delete an existing feature according to requirements for a particular machine type or model (step 1104). A feature may, for example, be a hardware component, such as a part, assembly, or sub-assembly, or a software component, such as an application, program, or operating system, for the particular machine type or model. This new or modified information for the particular machine type or model is translation source data, such as translation source data 206 in FIG. 2. Then, the configuration rule translation mapper receives a selection of one or more translation types, such as translation type 504 in FIG. 5 (step 1106).

Subsequently, the configuration rule translation mapper receives an input to trigger the configuration rule translation mapping process (step 1108). Then, the configuration rule translation mapper performs configuration rule translation mapping based on the one or more translation types selected to translate the translation source data into a desired format (step 1110). After performing the configuration rule translation mapping in step 1110, the configuration rule translation mapper transfers the properly formatted translation source data to a configurable transformation macro, such as configurable transformation macro 122 in FIG. 1 (step 1112).

Then, the configuration rule translation mapper executes the configurable transformation macro (step 1114). Subsequently, the configurable transformation macro reads an environment setup file for the configurable transformation macro (step 1116). The environment setup file is a file that contains data regarding the environment that the configurable transformation macro is being run in and the connections the configurable transformation macro has, such as, for example, external function paths, database connections, server uniform resource locators (URLs), and temporary folders and initial parameters for the configurable transformation macro. In addition, the configurable transformation macro reads extended functions, if any, for the configurable transformation macro (step 1118).

Further, the configurable transformation macro reads one or more transformation templates, such as transformation template 800 in FIG. 8 (step 1120). Furthermore, the configurable transformation macro reads input data from one or more source files, such as input data source files 126 in FIG. 1, or from other data sources, such as databases or data streams (step 1122). Afterward, the configurable transformation macro makes a determination as to whether any input data is untranslatable (step 1124).

If all the input data is translatable, no output of step 1124, then the configurable transformation macro outputs the final transformation output, such as transformation output 128 in FIG. 1, by, for example, writing the final transformation output to a storage device, such as persistent storage 108 in FIG. 1, printing the final transformation output to a printer, such as input/output unit 112 in FIG. 1, or displaying the final transformation output on a display device, such as display 114 in FIG. 1 (step 1126). Thereafter, the process terminates. If some or all of the input data is untranslatable, yes output of step 1124, then the configurable transformation macro tags the untranslatable input data with an indication code (step 1128). Subsequently, the configurable transformation macro outputs the untranslatable input data for a user to make the necessary corrections (step 1130). Thereafter, the process returns to step 1126.

Figure 12:
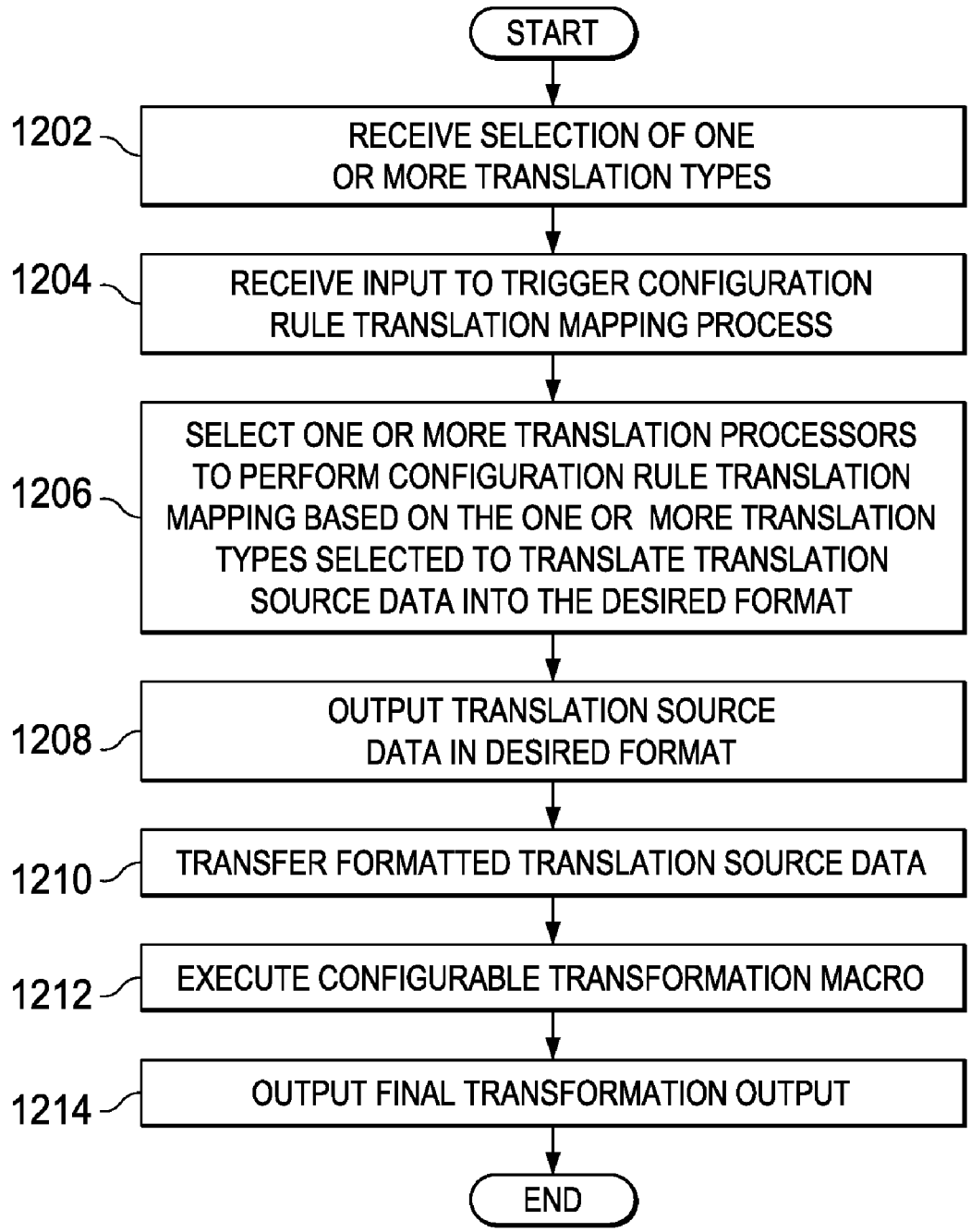
FIG. 12 is a flowchart illustrating an exemplary process for outputting translation source data in a desired format in accordance with an illustrative embodiment.

With reference now to FIG. 12, a flowchart illustrating an exemplary process for outputting translation source data in a desired format is shown in accordance with an illustrative embodiment. The process shown in FIG. 12 may be implemented in a configuration rule translation mapper, such as configuration rule translation mapper 116 in FIG. 1. Also, the process shown in FIG. 12 may be implemented in step 1110 in FIG. 11.

The process begins when configuration rule translation mapper receives a selection of one or more translation types, such as translation type 208 in FIG. 2 (step 1202). The translation type selection may be made by a user, such as user 202 in FIG. 2. Alternatively, the configuration rule translation mapper may make the translation type selection, itself.

Then, the configuration rule translation mapper receives an input to trigger the configuration rule translation mapping process (step 1204). After triggering the configuration rule translation mapping process in step 1204, the configuration rule translation mapper selects one or more translation processors, such as translation processor 306 in FIG. 3, to perform configuration rule translation mapping based on the one or more translation types selected to translate the translation source data into the desired format (step 1206). Subsequently, the configuration rule translation mapper outputs the translation source data in the desired format to a selected file (step 1208).

Then, the configuration rule translation mapper transfers the properly formatted translation source data to a configurable transformation macro, such as configurable transformation macro 122 in FIG. 1 (step 1210). Afterward, the configuration rule translation mapper executes the configurable transformation macro (step 1212). Subsequently, the configurable transformation macro outputs a final transformation output, such as transformation output 128 in FIG. 1, by writing the transformation output to a storage device (step 1214). The process terminates thereafter.

Thus, illustrative embodiments of the present invention provide a computer implemented method, system, and computer program product for performing configuration rule translation mapping. The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for performing configuration rule translation mapping, the computer implemented method comprising computer implemented steps of:

receiving one or more inputs to create a new feature according to requirements for a specific machine type by a configuration rule translation mapper, wherein the one or more inputs to create the new feature are translation source data;

receiving a selection of one or more translation types by the configuration rule translation mapper;

performing configuration rule translation mapping based on the one or more translation types selected to translate the translation source data into a desired format by the configuration rule translation mapper, wherein the configuration rule translation mapping translates and maps a structure of the specific machine type into data and images for a system, and wherein the configuration rule translation mapping performs language translation from a first language to a second language using a multi-language dictionary system;

transferring the translation source data translated into the desired format by the configuration rule translation mapper to a configurable transformation macro, wherein the configuration rule translation mapper is created by the configurable transformation macro;

determining whether a portion of the translation source data is untranslatable;

responsive to determining that a portion of the translation source data is untranslatable, tagging the portion of the translation source data that is untranslatable with an indication code;

outputting the portion of the translation source data that is untranslatable with the indication code for corrections; and outputting a final transformation output by the configurable transformation macro using a transformation macro script and one or more transformation templates.

2. The computer implemented method of claim 1, further comprising:
selecting one or more translation processors to perform the configuration rule translation mapping; and
outputting the translation source data translated into the desired format to a selected file.

3. The computer implemented method of claim 1, wherein the new feature is one of a hardware component feature or a software component feature for the specific machine type.

4. The computer implemented method of claim 1, wherein the specific machine type is a specific version of a data processing system.

5. The computer implemented method of claim 1, wherein the one or more translation types define a type of translation process that occurs during the configuration rule translation mapping.

6. The computer implemented method of claim 1, wherein the configuration rule translation mapper translates configuration rules into the desired format according to mapping information contained in the configuration rule translation mapper.

7. The computer implemented method of claim 1, wherein the configurable transformation macro is a macro that transforms source input data from a particular file format into another file format.

8. A data processing system for performing configuration rule translation mapping, comprising:
a bus system;
a storage device connected to the bus system, wherein the storage device stores a set of instructions; and
a processing unit connected to the bus system, wherein the processing unit executes the set of instructions to receive one or more inputs to create a new feature according to requirements for a specific machine type by a configuration rule translation mapper, wherein the one or more inputs to create the new feature are translation source data; receive a selection of one or more translation types by the configuration rule translation mapper; perform configuration rule translation mapping based on the one or more translation types selected to translate the translation source data into a desired format by the configuration rule translation mapper, wherein the configuration rule translation mapping translates and maps a structure of the specific machine type into data and images for a system, and wherein the configuration rule translation mapping performs language translation from a first language to a second language using a multi-language dictionary system; transfer the translation source data translated into the desired format by the configuration rule translation mapper to a configurable transformation macro, wherein the configuration rule translation mapper is created by the configurable transformation macro; determine whether a portion of the translation source data is untranslatable; tag the portion of the translation source data that is untranslatable with an indication code in response to determining that a portion of the translation source data is untranslatable; output the portion of the translation source data that is untranslatable with the indication code for corrections; and output a final transformation output by the configurable transformation macro using a transformation macro script and one or more transformation templates.

9. The data processing system of claim 8, wherein the processing unit executes a further set of instructions to select one or more translation processors to perform the configuration rule translation mapping; and output the translation source data translated into the desired format to a selected file.

10. The data processing system of claim 8, wherein the one or more translation types define a type of translation process that occurs during the configuration rule translation mapping.

11. A computer program product stored in a computer readable storage device having computer usable program code embodied therein that is executable by a computer for performing configuration rule translation mapping, the computer program product comprising:
computer usable program code for receiving one or more inputs to create a new feature according to requirements for a specific machine type by a configuration rule translation mapper, wherein the one or more inputs to create a new feature are translation source data;
computer usable program code for receiving a selection of one or more translation types by the configuration rule translation mapper;
computer usable program code for performing configuration rule translation mapping based on the one or more translation types selected to translate the translation source data into a desired format by the configuration rule translation mapper, wherein the configuration rule translation mapping translates and maps a structure of the specific machine type into data and images for a system, and wherein the configuration rule translation mapping performs language translation from a first language to a second language using a multi-language dictionary system;
computer usable program code for transferring the translation source data translated into the desired format by the configuration rule translation mapper to a configurable transformation macro, wherein the configuration rule translation mapper is created by the configurable transformation macro;
computer usable program code for determining whether a portion of the translation source data is untranslatable;
computer usable program code for tagging the portion of the translation source data that is untranslatable with an indication code in response to determining that a portion of the translation source data is untranslatable;
computer usable program code for outputting the portion of the translation source data that is untranslatable with the indication code for corrections; and computer usable program code for outputting a final transformation output by the configurable transformation macro using a transformation macro script and one or more transformation templates.

12. The computer program product of claim 11, further comprising:
    computer usable program code for selecting one or more translation processors to perform the configuration rule translation mapping; and
    computer usable program code for outputting the translation source data translated into the desired format to a selected file.

13. The computer program product of claim 11, wherein the configuration rule translation mapper translates configuration rules into the desired format according to mapping information contained in the configuration rule translation mapper.

14. The computer program product of claim 11, wherein the configurable transformation macro is a macro that transforms source input data from a particular file format into another file format.

* * * * *